US008514511B1

(12) United States Patent
Tran et al.

(10) Patent No.: US 8,514,511 B1
(45) Date of Patent: Aug. 20, 2013

(54) DISK-LOCKED LOOP IN SELF-SERVO-WRITE USING SPIRAL SYNC-MARK DETECTION

(75) Inventors: Hiep The Tran, Milpitas, CA (US); Jason Bellorado, Santa Clara, CA (US)

(73) Assignee: SK hynix memory solutions inc., San Jose, CA (US)

( * ) Notice: Subject to any disclaimer, the term of this patent is extended or adjusted under 35 U.S.C. 154(b) by 316 days.

(21) Appl. No.: 13/080,104

(22) Filed: Apr. 5, 2011

Related U.S. Application Data

(60) Provisional application No. 61/341,857, filed on Apr. 5, 2010.

(51) Int. Cl.
*G11B 5/596* (2006.01)
*G11B 5/09* (2006.01)

(52) U.S. Cl.
USPC .......................... 360/77.08; 360/51

(58) Field of Classification Search
None
See application file for complete search history.

(56) References Cited

U.S. PATENT DOCUMENTS

| 6,906,880 B1 * | 6/2005 | Codilian ................. 360/66 |
| 7,737,793 B1 * | 6/2010 | Ying et al. ............. 331/17 |
| 2004/0156137 A1 * | 8/2004 | Settje et al. ............ 360/51 |

* cited by examiner

*Primary Examiner* — Daniell L Negron
(74) *Attorney, Agent, or Firm* — Van Pelt, Yi & James LLP

(57) ABSTRACT

Writing servo wedge code to a disk is disclosed. A wedge-to-wedge time interval is determined. At least until it is determined that a lock criterion is met: For each wedge-to-wedge time interval, a wedge frequency error is computed based on an adjustable clock. The clock is adjusted based on one or more of the wedge frequency errors. It is determined whether a lock criterion is met based on one or more of the wedge frequency errors. After the lock criterion is met, servo wedge code is written to the disk.

23 Claims, 13 Drawing Sheets

DISK-LOCKED LOOP IN SELF-SERVO-WRITE USING SPIRAL SYNC-MARK DETECTION

CROSS REFERENCE TO OTHER APPLICATIONS

This application claims priority to U.S. Provisional Patent Application No. 61/341,857 entitled DISK-LOCKED LOOP IN SELF-SERVO-WRITE USING SPIRAL SYNC-MARK DETECTION filed Apr. 5, 2010 which is incorporated herein by reference for all purposes.

BACKGROUND OF THE INVENTION

A hard disk drive (HDD) is a device for writing and reading digital data. Data is magnetically read from and written to rotating disks by read and write heads that hover close to the surface of the disk. An arm moves the heads across the disks as they spin, allowing each head to access various locations on the surface of the disk.

A servo system is used to control the movement of the arm and the rotation of the disk. Servo code is written to certain portions of the HDD and is used by the servo system to control the position of the heads when they read and write. Because of this, the accuracy and precision of where the servo code is written is important. Improved techniques for servo writing would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
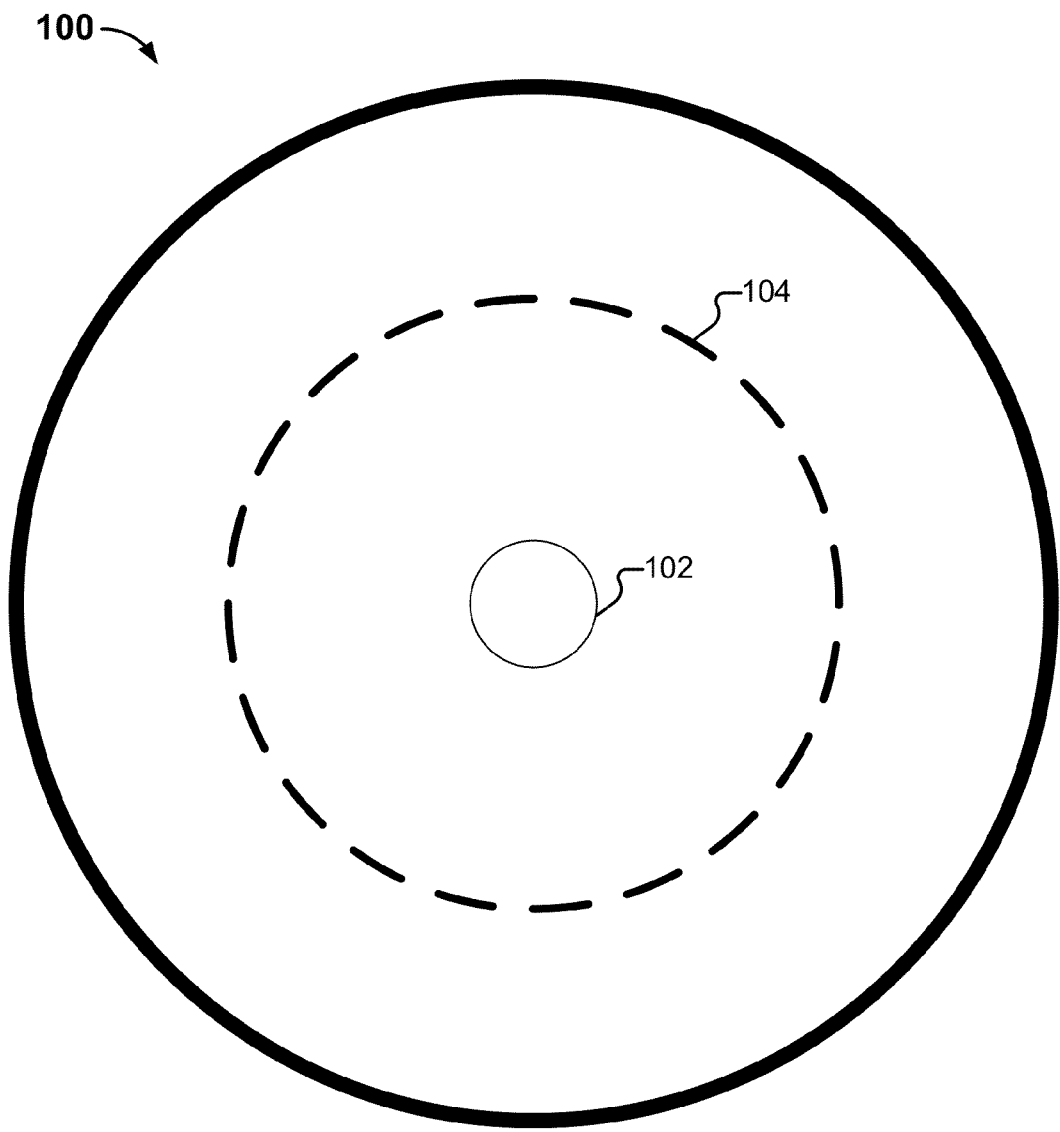
FIG. 1 is a diagram illustrating an example of a disk of a hard disk drive.

FIG. 1 is a diagram illustrating an example of a disk of a hard disk drive. In the example shown, disk 100 includes a spindle 102 around which the disk rotates. Disk 100 includes a plurality of concentric circular tracks to which data is written and from which data is read. Track 104 is an example of one of the concentric tracks.

Figure 2:
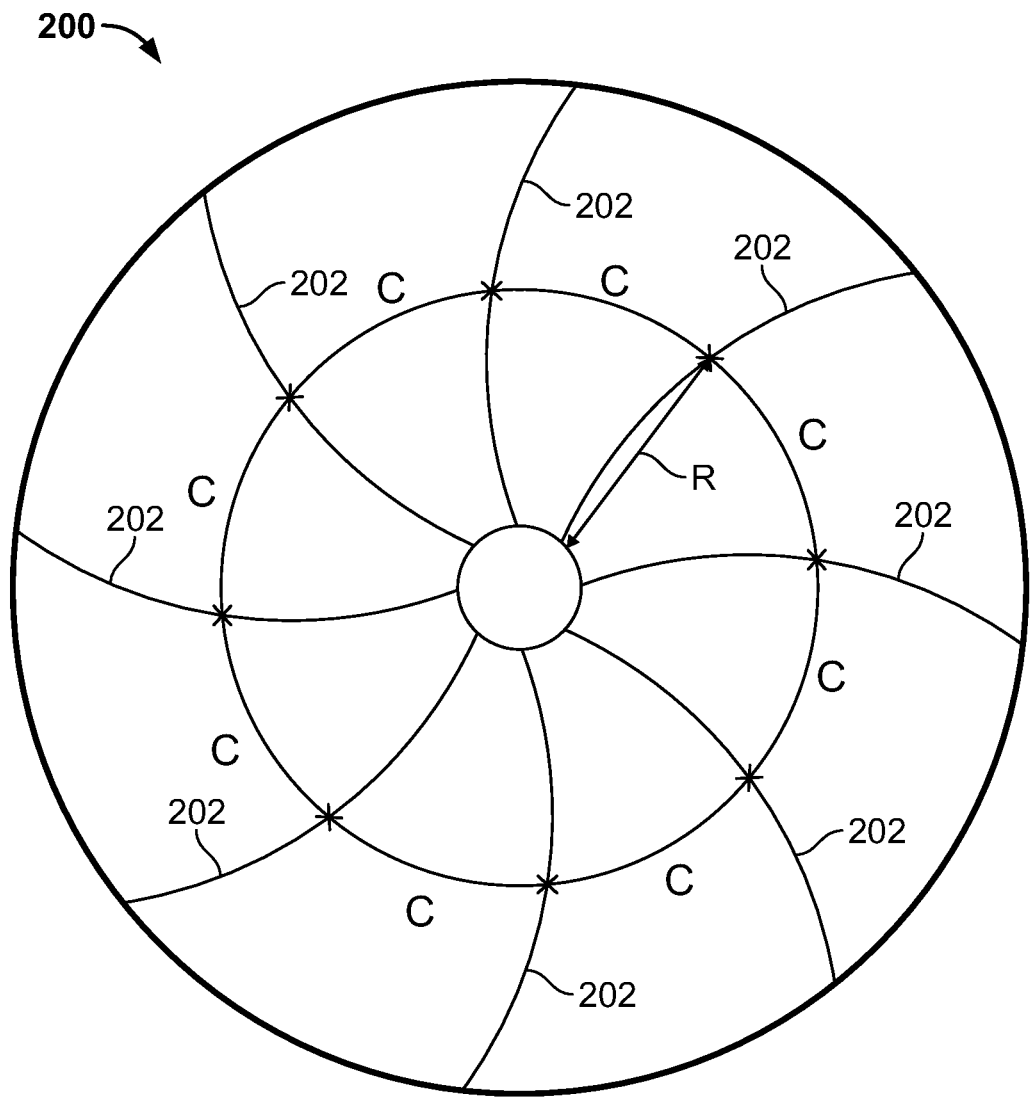
FIG. 2 is a diagram illustrating an example of servo code on a disk.

FIG. 2 is a diagram illustrating an example of servo code on a disk. In the example shown, disk 200 includes servo code written along arcs 202 that extend out radially from the center of disk 200 as shown. Arcs 202 are also referred to as servo wedges 202 because they divide the disk into (curved) wedges. Servo wedges 202 are tangentially/circumferentially equidistant from each other. For example, at any radius R from the center of disk 200, the servo wedges are spaced apart by a circumferential distance C. (A circumferential or tangential distance is the distance along the circumference of a circle centered on the disk). For clarity, the examples herein show 8 servo wedges per disk. However, these examples can be extended to any number of servo wedges per disk.

It is important for servo wedges 202 to be written at precise locations on the disk because servo wedges 202 are used to position the read/write heads of the disk. To accomplish this, during the servo writing process, the position of the write head must be carefully controlled both in the radial and tangential directions. In other words, if the design is for the servo wedges to be placed as shown in disk 200, then at every radial distance R, the servo wedges should be spaced apart by an exact circumferential distance C (within an acceptable margin of error).

In some systems, special servo writer hardware is used, which is time consuming and expensive. In other systems, an embedded system-on-a-chip (SoC) is configured to write servo code to the disk during manufacturing. In such systems, each disk can write its own servo, so this procedure is referred to as self servo write (SSW). Some SSW systems require a complicated feedforward mechanism, do not have high error tolerance in the position of the spiral waveform on the disk, and/or require prewritten seed servo wedges. In some embodiments, the techniques disclosed herein do not have the above drawbacks. For example, the disclosed techniques may be used with or without prewritten servo wedges (seed servo wedges).

In some embodiments, the disclosed techniques require that the head be centered on the track (i.e., the radial position of the head is controlled). In various embodiments, this can be accomplished using techniques such as seed servo wedges or using the amplitude and location of detected sync marks in the SSW spiral waveform, described below.

Figure 3:
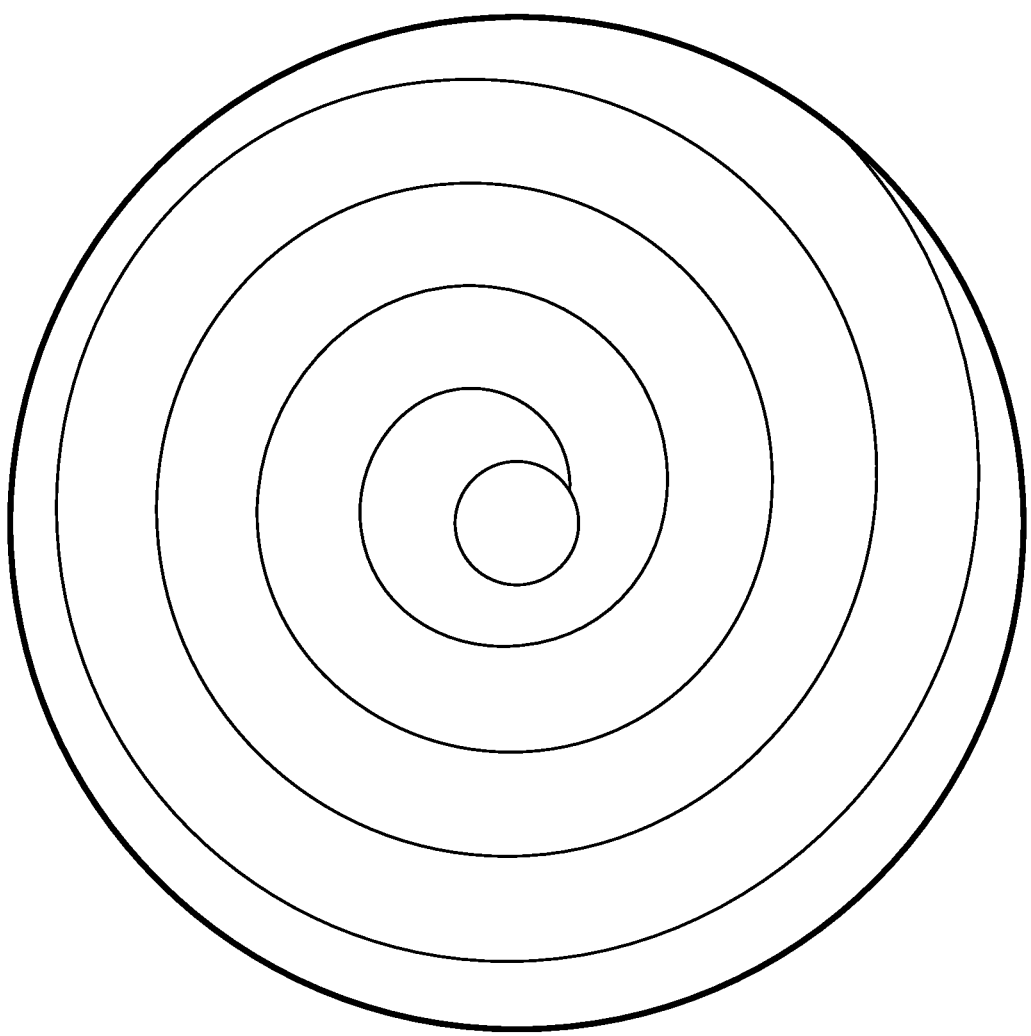
FIG. 3 is a diagram illustrating an example of a spiral waveform written to a disk.

FIG. 3 is a diagram illustrating an example of a spiral waveform written to a disk. In some SSW systems, prior to servo writing, a waveform is written to the disk in a spiral pattern, resulting in a spiral waveform. The purpose of the spiral waveform is to correctly position the servo wedges written to the disk, as will be more fully described below.

In some embodiments, the waveform in the spiral waveform comprises a repeating pattern. In some embodiments, the repeating pattern comprises a preamble pattern (which appears as a sine-wave when read off the disk) followed by a sync mark pattern. Therefore, the sync mark pattern repeats at regular intervals in the waveform.

In some SSW systems, the spiral waveform must be precisely located in order to be effectively used to write servo to the disk. However, in the techniques disclosed herein, the spiral waveform is not required to be precisely located in order to yield good results (e.g., a precisely located servo wedge with an acceptable margin of error).

Figure 4:
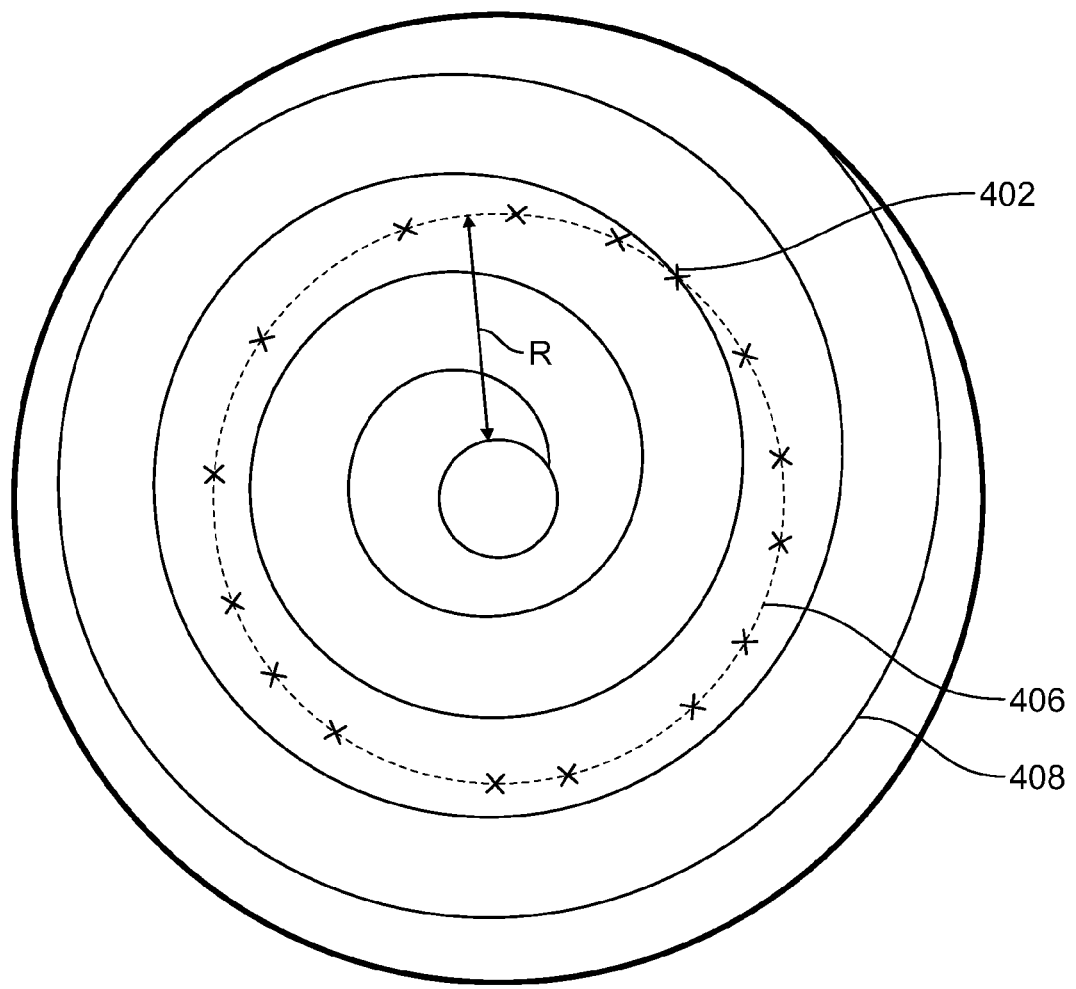
FIG. 4 is a diagram illustrating an example of a spiral waveform written to a disk and a track on the disk.

FIG. 4 is a diagram illustrating an example of a spiral waveform written to a disk and a track on the disk. 8 servo wedges are to be written in this example. In this example, the read head is currently positioned/spinning above track 406 at radius R. As shown, the track intersects the spiral waveform 408 at exactly one location (at the point where the spiral waveform has radius R), intersection 402.

In some embodiments, more than one spiral waveform (e.g., of different sizes) is written to the disk, which assists with servo writing. In some embodiments, two spiral waveforms are written per servo wedge to be written to the disk. For example, if there are $N_{wedge}$ servo wedges, then $2N_{wedge}$ spiral waveforms are written. This means there will be two intersections of the track with two spiral waveforms per wedge. The spiral waveforms do not need to be evenly spaced from each other.

In the example shown, there are 8 servo wedges to be written, so 16 spiral waveforms would be written (or 15 additional spiral waveforms would be written in addition to the one shown). For clarity, only one spiral waveform is shown; however, the intersections of the track with the 16 spiral waveforms are indicated by X marks. The X marks do not need to be evenly spaced from each other.

Figure 5:
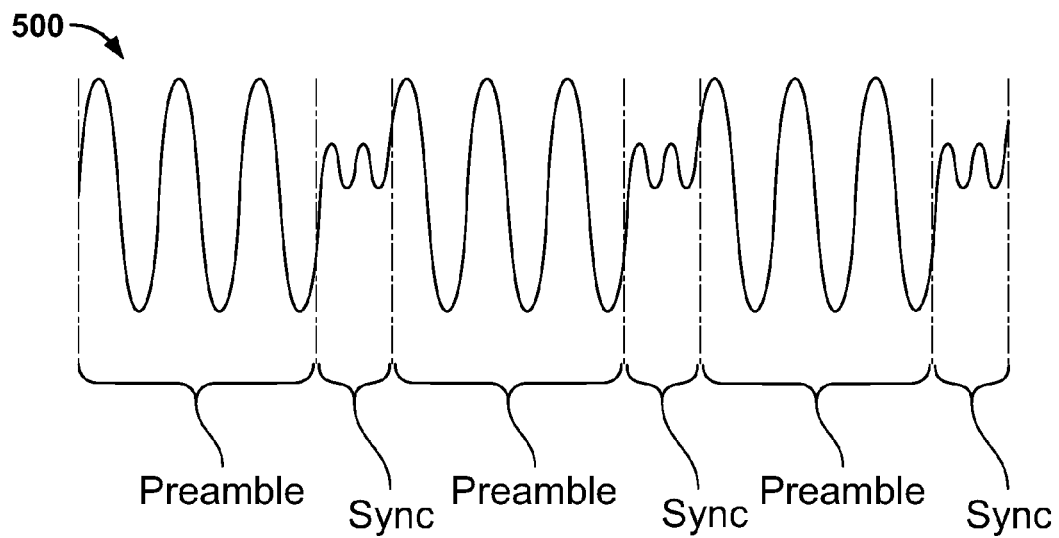
FIG. 5 is an example of a waveform used to create a spiral waveform in some embodiments.

FIG. 5 is an example of a waveform used to create a spiral waveform in some embodiments. As shown, waveform 500 comprises a repeating pattern of a preamble followed by a sync portion.

Figure 6:
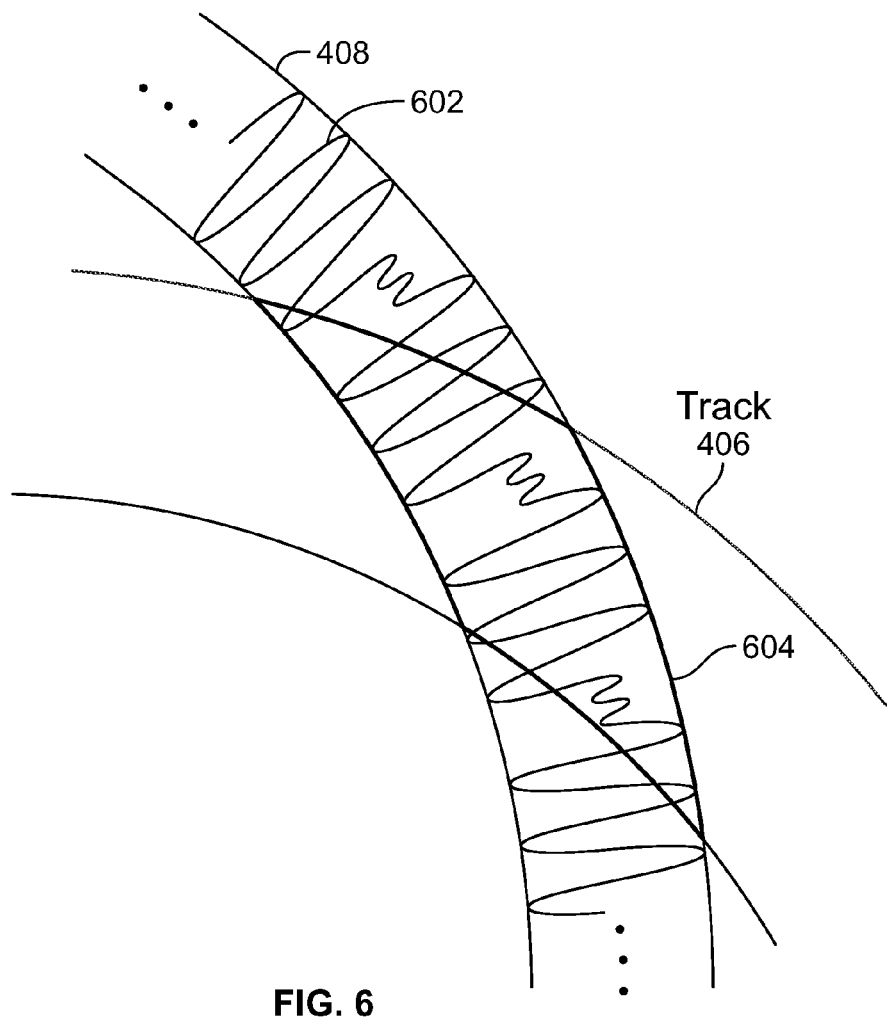
FIG. 6 is an example of an intersection of a spiral waveform with a track on a disk.

FIG. 6 is an example of an intersection of a spiral waveform with a track on a disk. In some embodiments, this diagram is an enlargement of the region corresponding to intersection 402 from FIG. 4. In this example, waveform 500 is applied to spiral pattern 408, creating spiral waveform 602. The intersection of spiral waveform 602 with track 406 yields a curved diamond shaped overlapping region 604. In this example, region 604 includes 3 sync mark patterns.

Figure 7:
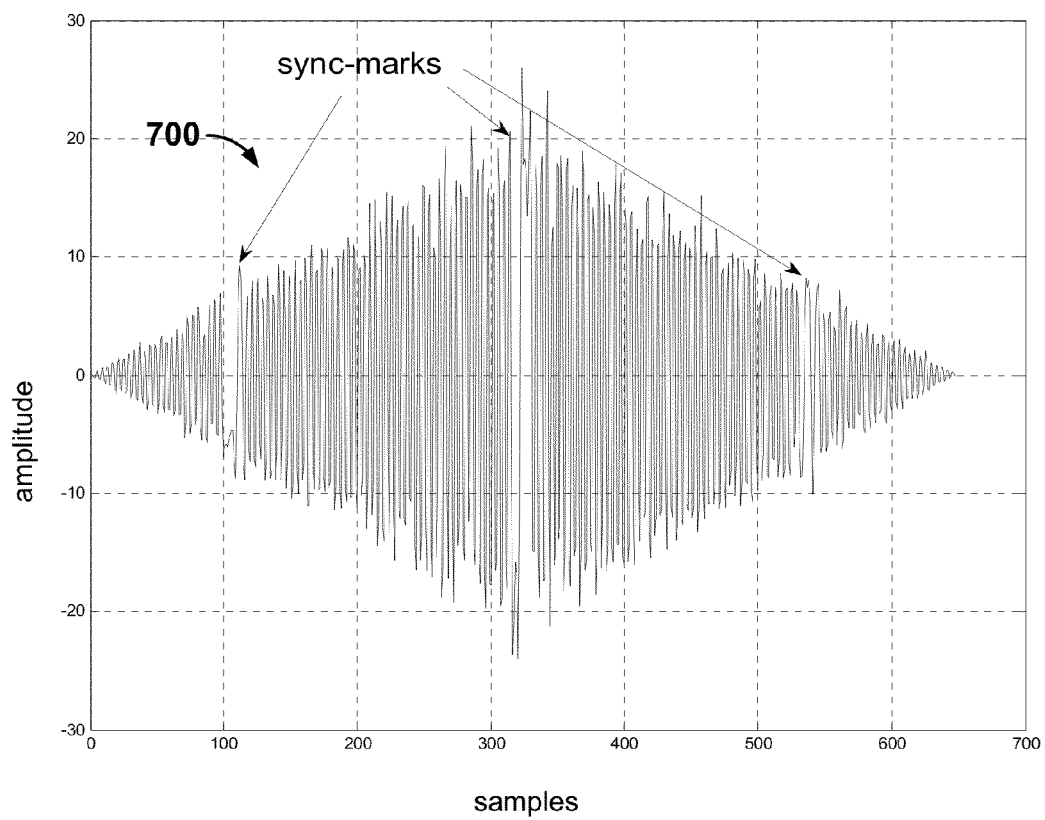
FIG. 7 is an example of the waveform read from a track where the track intersects with a spiral waveform.

FIG. 7 is an example of the waveform read from a track where the track intersects with a spiral waveform. For example, this waveform corresponds to a region such as region 604. Due to the angle at which the read head cuts through the spiral waveform, when the spiral waveform is read from the track, the read back wave form will have an envelope that is shaped like a diamond (or whatever the shape of the intersection is). As used herein, "spiral segment" refers to the read back waveform in the region where the spiral waveform intersects with the track on the disk. In this example, there are three sync mark portions within the spiral segment.

In some embodiments, there are at least one (or two) spiral segments per wedge to be written. In some embodiments, within each spiral segment, there is at least one detectable sync mark.

Figure 8:
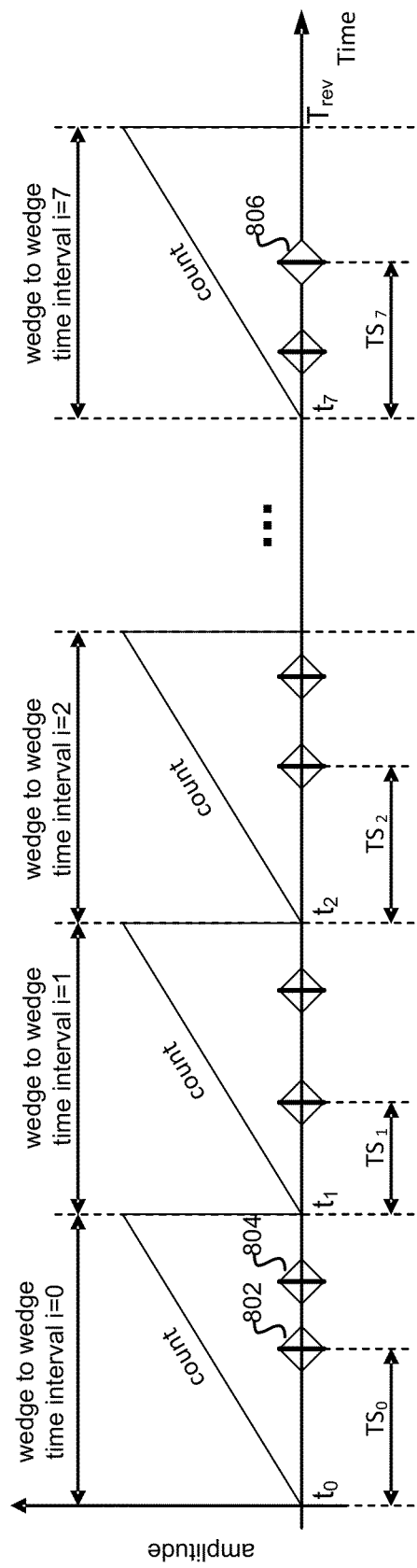
FIG. 8 is an example illustrating a conceptual diagram of a read back waveform from a read head hovering at a fixed radius (track) over a rotating disk over one revolution.

FIG. 8 is an example illustrating a conceptual diagram of a read back waveform from a read head hovering at a fixed radius (track) over a rotating disk over one revolution. The y-axis is the amplitude of the read back waveform (and counter count, as more fully described below). The x-axis is time. As shown, there are spiral segments (the diamonds) wherever the track intersects the spiral waveform. For example, spiral segments 802 and 804 are the first two spiral segments.

In the example shown, the x-axis is divided into wedge-to-wedge time intervals, where one wedge-to-wedge time interval is the time it takes for the head to go from one wedge to the next. For example, in FIG. 2, there are 8 wedges evenly spaced circumferentially around the disk. Therefore, there would be 8 wedge-to-wedge time intervals In some embodiments, the wedge-to-wedge time interval is the desired number of clock cycles separating each wedge. In some embodiments, the wedge-to-wedge time interval can be computed based on the total revolution time. Total revolution time $T_{rev}$ is the time it takes the head to pass over one revolution of the rotating disk. In this case, the wedge-to-wedge time interval would be $T_{rev}/8$ in this example.

In some embodiments, the SSW system uses a clock to write servo wedges. In some embodiments, the clock is a modulo counter (e.g., it counts from 0 to $N_{clock}$ and then resets to 0 and repeats). In the example shown, the modulo counter is configured to reset to 0 after counting the length of one wedge-to-wedge time interval. The modulo counter value is shown as "count".

Initially, the disk has no servo wedges written, and it is unlikely that the starting point of each wedge-to-wedge time interval (e.g., t0, t1, t2, . . . , t7) is actually aligned with a desired wedge location. For example, the clock may be too slow or too fast in frequency. In some embodiments, the modulo counter is adjustable in frequency and/or phase. In some embodiments, the goal is adjust or tweak the frequency and/or phase of the modulo counter such that the starting point of each wedge-to-wedge time interval (e.g., t0, t1, t2, . . . , t7) is aligned with a desired wedge location (within an acceptable degree of error). As used herein, once this condition is reached, the system has reached closure and is in a lock state. In the lock state, the clock or counter is tuned to the correct frequency such that the start of each wedge-to-wedge time interval coincides with where a servo wedge should be written (i.e., a fixed circumferential location on every revolution). In other words, the clock resets where a servo wedge should be written.

Although the examples herein discuss writing a servo wedge when the clock resets, in various embodiments, the servo wedge may be written at any preconfigured time/distance from when the clock resets. In the lock state, the clock resets at the same circumferential location on every revolution, providing fixed reference point(s) and from the fixed reference point(s), servo code can be written in any desired location, which could be in a wedge shape or not.

Figure 9:
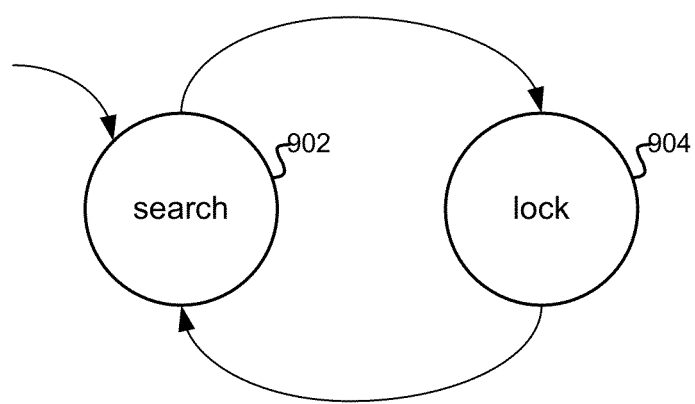
FIG. 9 is a state diagram associated with servo writing in some embodiments.

FIG. 9 is a state diagram associated with servo writing in some embodiments. There are two states: a search state 902 and a lock state 904. The system starts in search state 902. In search state 902, the system attempts to reach closure (and a lock state) by running process 1000 described below. Once the system reaches closure, lock state 904 is entered. In some embodiments, in lock state 904, the system maintains the lock state by running process 1200 described below. During lock state 904, servo wedge writing is performed. In some embodiments, if the system loses closure, it returns to search state 902.

Figure 10:
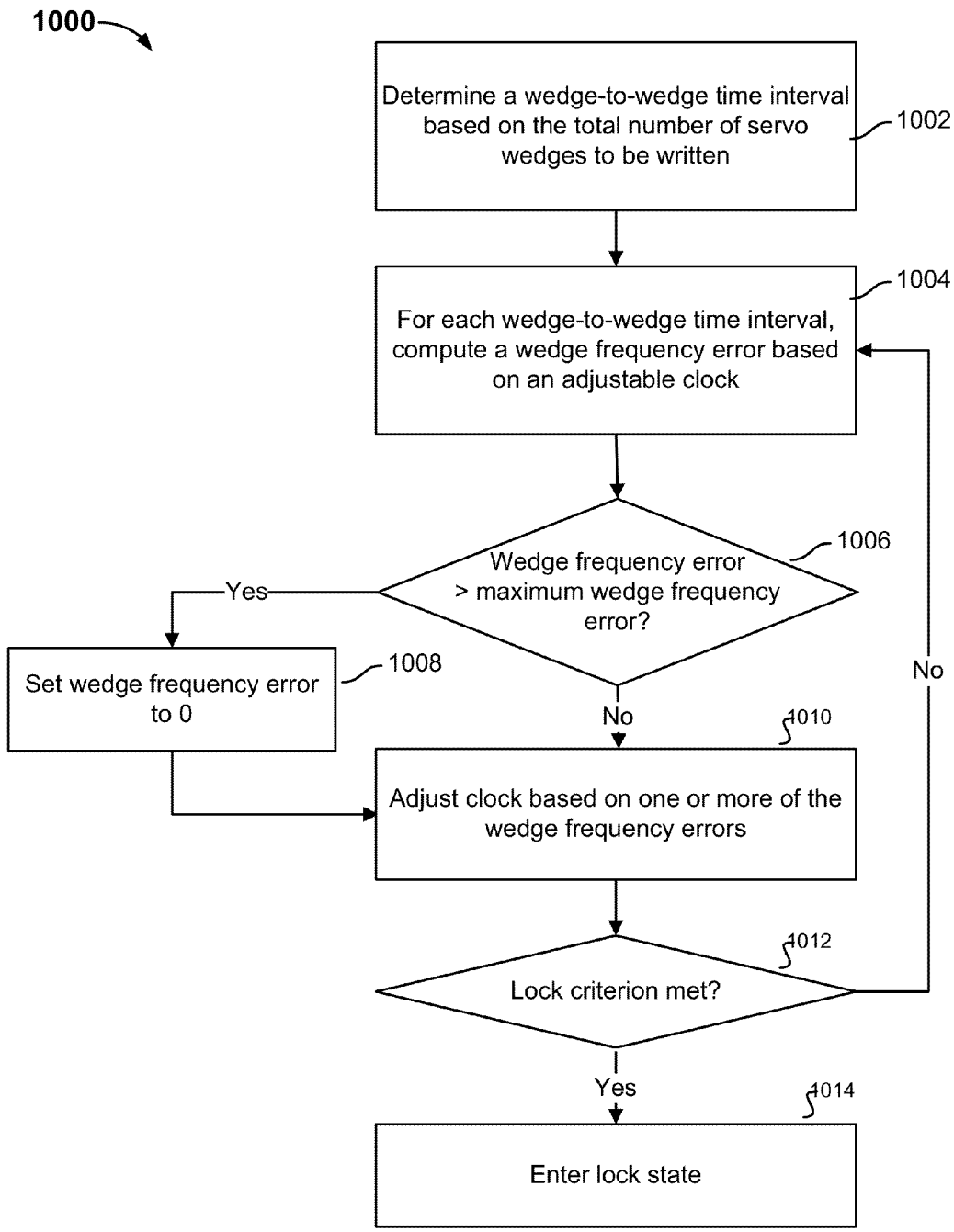
FIG. 10 is a flow chart illustrating an embodiment of a process run during a search state.

FIG. 10 is a flow chart illustrating an embodiment of a process run during a search state. In some embodiments, process 1000 is used to bring a system to closure or a lock state.

At 1002, a wedge-to-wedge time interval is determined based on the total number of servo wedges to be written. In some embodiments, if the number of wedges to be written is $N_{wedge}$ then the wedge-to-wedge time interval is total revolution time/$N_{wedge}$. Time may be measured using a clock, such as a modulo counter. For example, the SSW system may have an embedded counter that counts servo clock cycles and resets when reaching a specified count $N_{clock}$. In some embodiments, the counter is configured to reset to 0 when the wedge-to-wedge time interval (i.e., number of clock cycles separating adjacent servo wedges) is reached. In this case, the wedge-to-wedge time interval is $N_{clock}$. At this point in the process, the counter resets at some time that is not necessarily the same as where the servo wedge should be written because for example, the counter frequency may be too small or too large (i.e., the counter may be counting too slow or too fast). In some embodiments, the goal is to adjust the frequency of the counter so that it resets at the same time that the read/write head is where the servo wedge is to be written.

At 1004, for each wedge-to-wedge time interval, a wedge frequency error is computed based on an adjustable clock. In some embodiments, this is performed according to process 1100 described below. In some embodiments, the wedge frequency error for each wedge-to-wedge time interval i is $FERR_i=TS_i(previous)-TS_i(current)$ as is more fully described in process 1100 below.

At 1006, it is determined whether the absolute value of the wedge frequency error is greater than a maximum wedge frequency error $FERR_{max}$.

If the absolute value of wedge frequency error is greater than a maximum wedge frequency error $FERR_{max}$, then at 1008, the wedge frequency error is set equal to 0. In other words, If $|FERR_i|>FERR_{max}$, then set $FERR_i=0$.

The reason for this is to avoid saturation and/or instability in the loop filter, which is more fully described below. The process then proceeds to 1010.

At 1010, the clock is adjusted based on one or more of the wedge frequency errors. In some embodiments, the amount to adjust the clock is determined based at least in part on a loop filter, as more fully described below.

At 1012, it is determined whether a lock criterion is met. In some embodiments, the lock criterion is that the absolute value of the wedge frequency error for each wedge-to-wedge time interval is within a predefined threshold during a predefined number of consecutive disk revolutions. In other words, $0 \leq |FERR_i| \leq FERR_{lim}$ for all $i=1,2,\ldots,N_{wedge}$ during $N_{rev}$ consecutive disk revolutions.

If the lock criterion is met, then at 1014, the system enters a lock state and has reached closure. In some embodiments, once the lock state is entered, servo wedge writing may begin.

If the lock criterion is not met, then the process returns to 1004.

Figure 11:
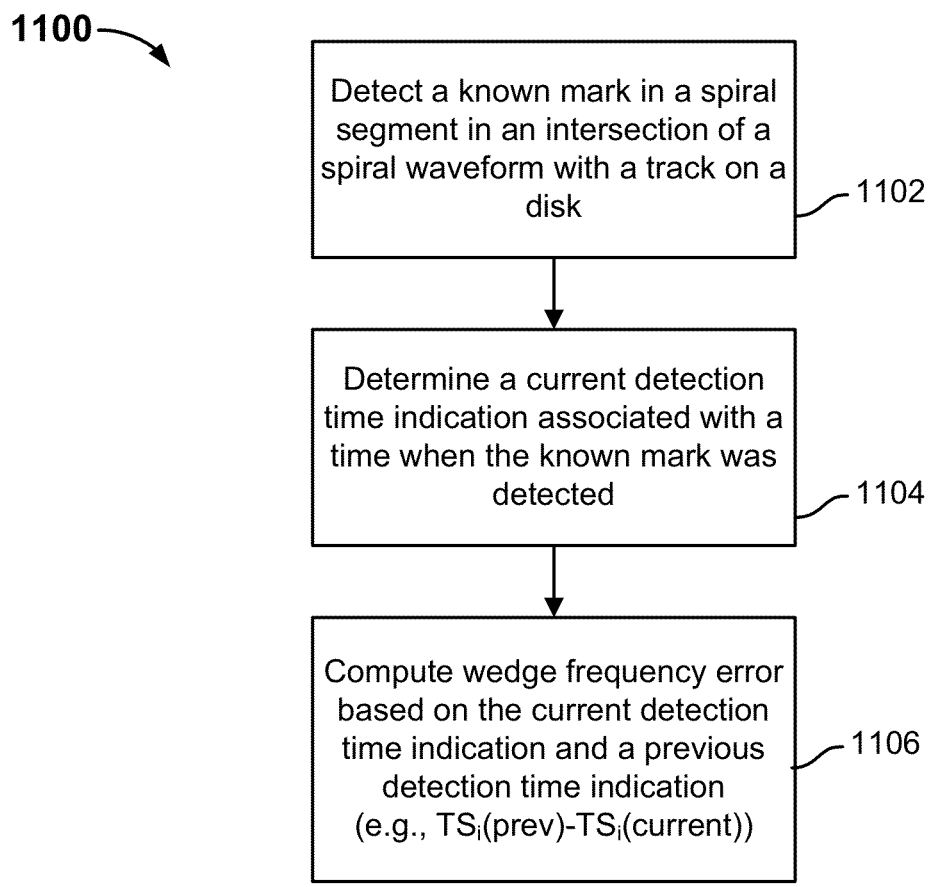
FIG. 11 is a flow chart illustrating an embodiment of a process for computing a wedge frequency error.

FIG. 11 is a flow chart illustrating an embodiment of a process for computing a wedge frequency error. In some embodiments, this process is used to perform 1004 and is performed for each wedge-to-wedge time interval.

At 1102, a known mark in a spiral segment is detected. As previously described, a spiral segment is the read back waveform at the intersection of a spiral waveform with a track being read on the disk. In the example of FIG. 8, there are 8 wedge-to-wedge time intervals. In the first wedge-to-wedge time interval, there are two spiral segments: spiral segment 802 and spiral segment 804. In the case where there are more than one spiral segments in a particular wedge-to-wedge time interval, then one is selected as the one in which to detect a known mark every disk revolution. For example, in FIG. 8, the first spiral segment 802 is selected in the first interval and the second spiral segment 806 is selected for the last interval. In some embodiments, it is randomly selected. In some embodiments, the same one (e.g., the first one) is always selected.

In some embodiments, the known mark is a mark that appears periodically in the spiral segment, such as a sync mark. In some cases, there are more than one known marks per spiral segment. In such cases, one of the known marks is selected as the one to detect. For example, FIG. 7 shows a spiral segment 700 in which there are three sync marks. If spiral segment 802 looked like spiral segment 700, then one of the known marks, e.g., the second sync mark, may be selected as the one to detect. In some embodiments, it is randomly selected. In some embodiments, the same one (e.g., the first one) is always selected.

At 1104, a current detection time indication associated with a time when the known mark was detected is determined. In some embodiments, the current detection time is the current count (or time stamp) of the clock at the time that the selected known mark is detected. In the example of FIG. 8, the current detection time indication for the first wedge-to-wedge time interval i is indicated as $TS_i$. Due to the variation in the written position of each spiral (and the stochastic nature of the read back signal), the values of all time stamps are most likely not equivalent, i.e., $TS_i \neq TS_j, i \neq j$.

At 1106, a wedge frequency error is computed based at least in part on the current detection time indication and a previous detection time indication. In some embodiments, the previous detection time indication is the detection time indication of the same known mark at the previous. For example, referring to FIG. 8, the wedge frequency error is defined as:

$FERR_i=TS_i(prev)-TS_i(current)$ where $TS_i(current)$ is the time stamp value at the current disk revolution and $TS_i(previous)$ is the time stamp value at the previous disk revolution.

Figure 12:
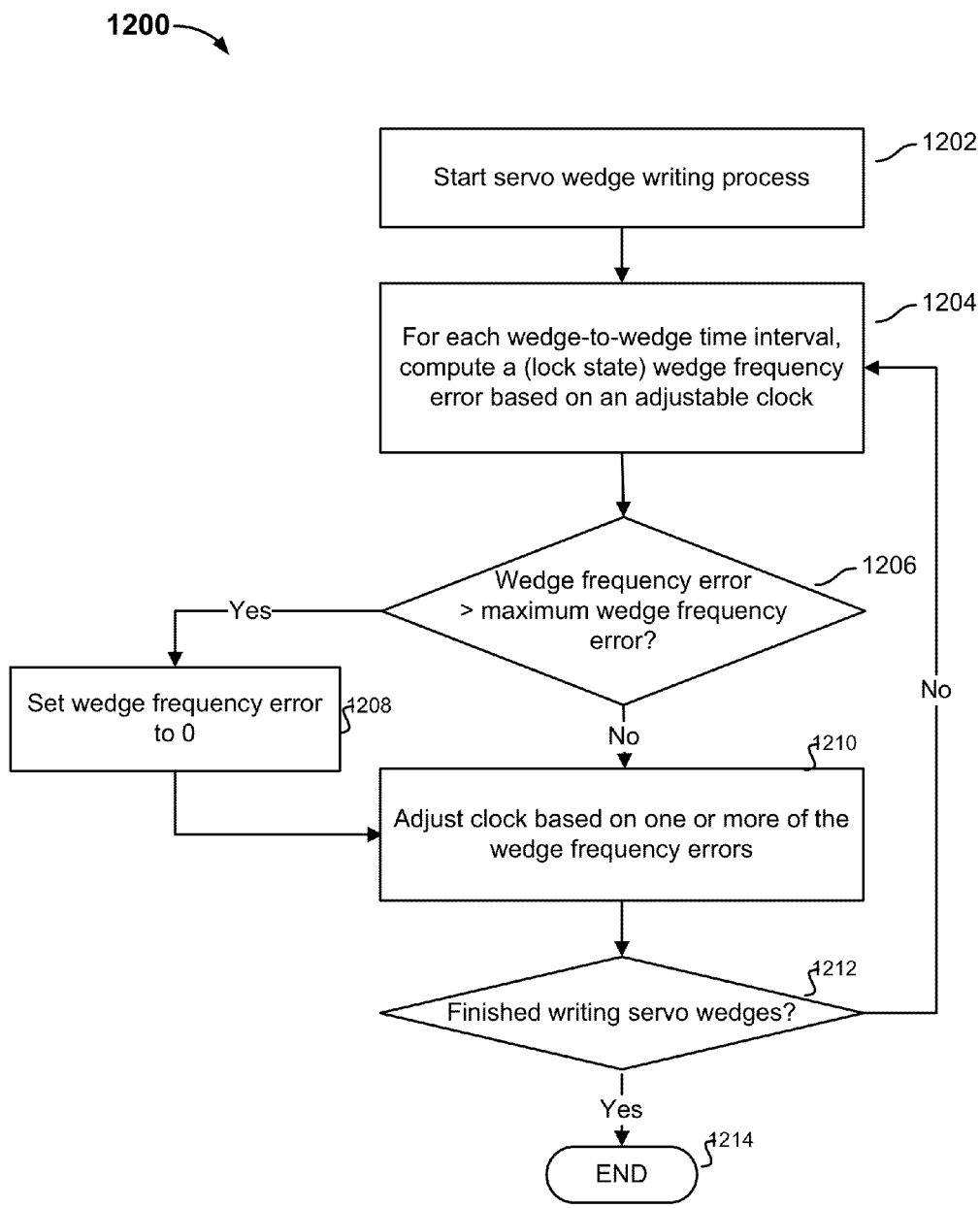
FIG. 12 is a flow chart illustrating an embodiment of a process run during a lock state.

FIG. 12 is a flow chart illustrating an embodiment of a process run during a lock state. In some embodiments, process 1200 is run during a servo wedge writing process in order to maintain the lock state. In some embodiments, 1204-1210 of process 1200 are similar to 1004-1012 of process 1000 except that the wedge frequency error at 1204/1004 is computed differently in the lock state than in the search state.

At 1202, servo wedge writing is started.

At 1204, for each wedge-to-wedge time interval, a wedge frequency error is computed based on an adjustable clock. In some embodiments, this is performed according to process 1300 described below. In some embodiments, the wedge frequency error for each wedge-to-wedge time interval i is $$FERR_i = Tg_i - TS_i(\text{current})$$

where $Tg_i$ is a target value for wedge interval i, as more fully describe in process 1300 below.

At 1206, it is determined whether the absolute value of the wedge frequency error is greater than a maximum wedge frequency error $FERR_{max}$. In some embodiments, the maximum wedge frequency error $FERR_{max}$ is different in the lock state than in the search state.

If the wedge frequency error is greater than a maximum wedge frequency error, then at 1208, the wedge frequency error is set equal to 0. In other words, $$\text{If}|FERR_i| > FERR_{max}, \text{then set } FERR_i = 0.$$

The reason for this is to avoid saturation and/or instability in the loop filter, which is more fully described below. The process then proceeds to 1210.

At 1210, the clock is adjusted based on one or more of the wedge frequency errors. In some embodiments, the clock is adjusted once for every wedge-to-wedge time interval, for example, when the known mark is detected. In some embodiments, the clock is adjusted even if $FERR_i$ is set to zero at 1208. In some embodiments, the amount to adjust the clock is determined based at least in part on a loop filter, as more fully described below.

At 1212, it is determined whether the servo wedges are finished being written.

If the servo wedges are finished being written, then the process ends at 1214. In some embodiments, at 1214, the process goes to the next track and repeats writing wedges for this track while in the lock state.

In some embodiments at 1212, it is determined whether all the servo wedges are finished being written to the disk, and not necessarily just one servo wedge or track.

Figure 13:
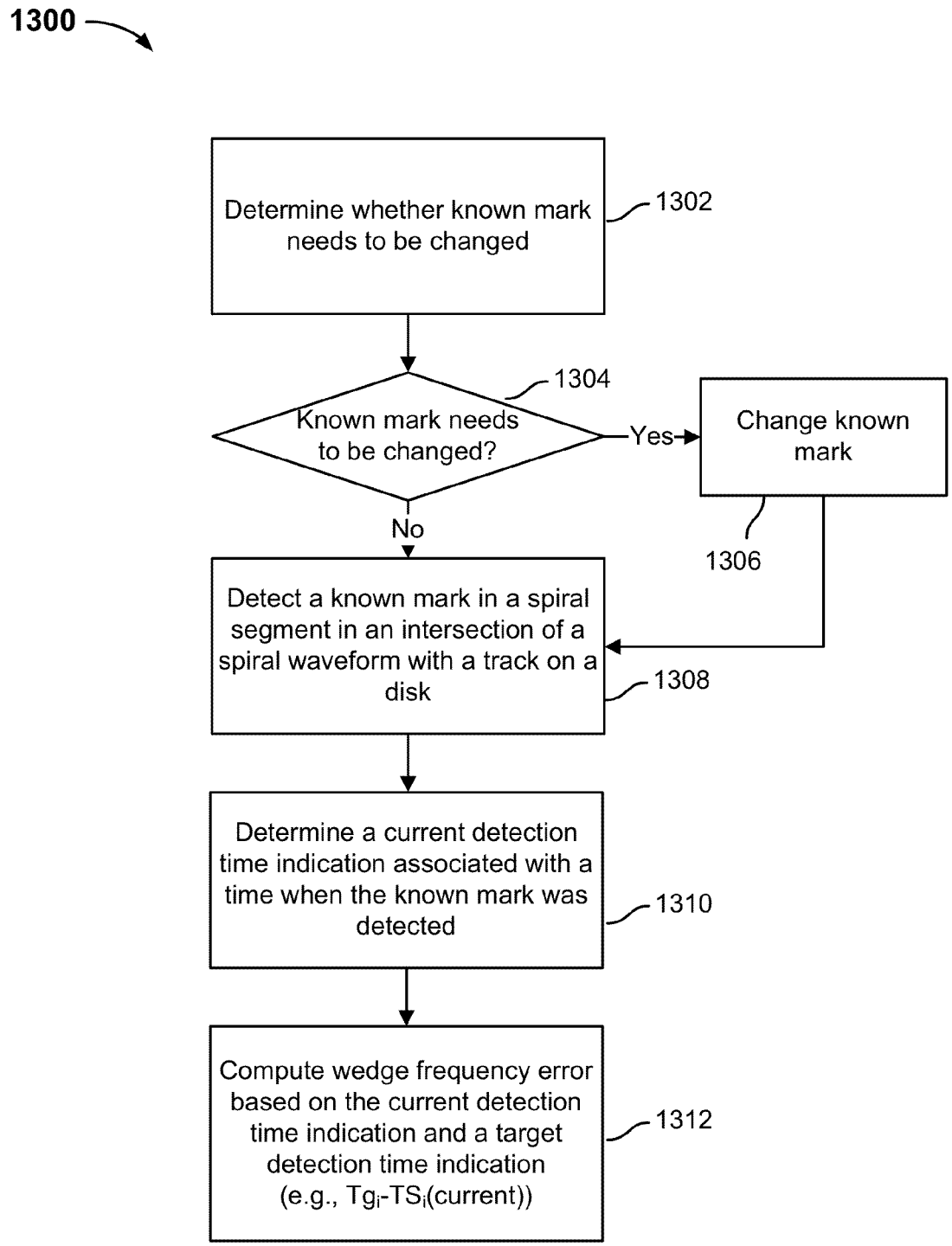
FIG. 13 is a flow chart illustrating an embodiment of a process for computing a wedge frequency error.

FIG. 13 is a flow chart illustrating an embodiment of a process for computing a wedge frequency error. In some embodiments, this process is used to perform 1304 and is performed for each wedge-to-wedge time interval. In some embodiments, 1308-1312 of process 1300 are similar to 1102-1106 of process 1100 except that the wedge frequency error at 1312/1106 is computed differently.

At 1302, it is determined whether a known mark needs to be changed to a different known mark. While in the lock state, it may be the case that the known mark (e.g., sync mark) used during the $i^{th}$ wedge-to-wedge time interval may need to be changed to another known mark in the same wedge-to-wedge time interval. This may occur, for example, when a servo wedge is written over the position of the known mark (since a servo writing process is simultaneously being performed during the lock state). This is why in some embodiments, the design requires at least two spiral segments per wedge-to-wedge time interval.

At 1304, if it is determined that the known mark needs to be changed, then at 1306, the known mark is changed to a new known mark in the same wedge-to-wedge time interval. From now on, the new known mark is used in the equations described below. For example, the time stamp $TS_i$ is now when the new known mark is detected and the target value $Tg_i$ is now computed based on only on time stamp(s) associated with the new known mark.) The process continues at 1308.

At 1304, if it is determined that the known mark does not need to be changed, then the process continues at 1308.

At 1308, a known mark in a spiral segment is detected. As previously described, a spiral segment is the read back waveform at the intersection of a spiral waveform with a track on the disk. In the example of FIG. 8, there are $N_{wedge}$ wedge-to-wedge time intervals. In the first wedge-to-wedge time interval, there are two spiral segments: spiral segment 802 and spiral segment 804. In the case where there are more than one spiral segments in a particular wedge-to-wedge time interval, then one is selected as the one in which to detect a known mark every disk revolution. For example, in FIG. 8, the first spiral segment 802 is selected. In some embodiments, it is randomly selected. In some embodiments, the same one (e.g., the first one) is always selected.

In some embodiments, the known mark is a mark that appears periodically in the spiral segment, such as a sync mark. In some cases, there are more than one known marks per spiral segment. In such cases, one of the known marks is selected as the one to detect. For example, FIG. 7 shows a spiral segment 700 in which there are three sync marks. If spiral segment 802 looked like spiral segment 700, then one of the known marks, e.g., the second sync mark, may be the selected as the one to detect. In some embodiments, it is randomly selected. In some embodiments, the same one (e.g., the first one) is always selected.

At 1310, a current detection time indication associated with a time when the known mark was detected is determined. In some embodiments, the current detection time is the current count (or time stamp) of the clock at the time that the selected known mark is detected. In the example of FIG. 8, the current detection time indication for the first wedge-to-wedge time interval i is indicated as $TS_i$. Due to the variation in the written position of each spiral (and the stochastic nature of the read back signal), the values of all time stamps are most likely not equivalent, i.e., $$TS_i \neq TS_j, i \neq j.$$

At 1312, a wedge frequency error is computed based at least in part on the current detection time indication and a target time indication. For example, referring to FIG. 8, the wedge frequency error is defined as:

$$FERR_i = Tg_i - TS_i(\text{current}), I=1,2,\ldots,N$$

where $Tg_i$ is a target time indication for wedge interval i.

The target time indication $Tg_i$ may be defined differently in different embodiments. In some embodiments, $Tg_i$=the value of time stamp $TS_i$ when changing to the lock state. In some embodiments, $Tg_i$ is the average of time stamp $TS_i$ over a fixed number of consecutive disk revolutions. This may be a running average and constantly being updated or not. In some embodiments, $Tg_i = TS_i(\text{previous})$, in which case $FERR_i$ is the same in the lock state as in the search state.

The reason for defining $FERR_i$ differently in the lock state compared to the search state is to help maintain closure or the frequency lock of the clock. It was found that if $FERR_i$ was defined to be the same in the lock state as the search state, then all of the starting points of each wedge-to-wedge interval may be shifted without being detected.

Although a modulo counter may be described in the examples herein, the disclosed techniques may be used with any time of clock/counter.

Figure 14:
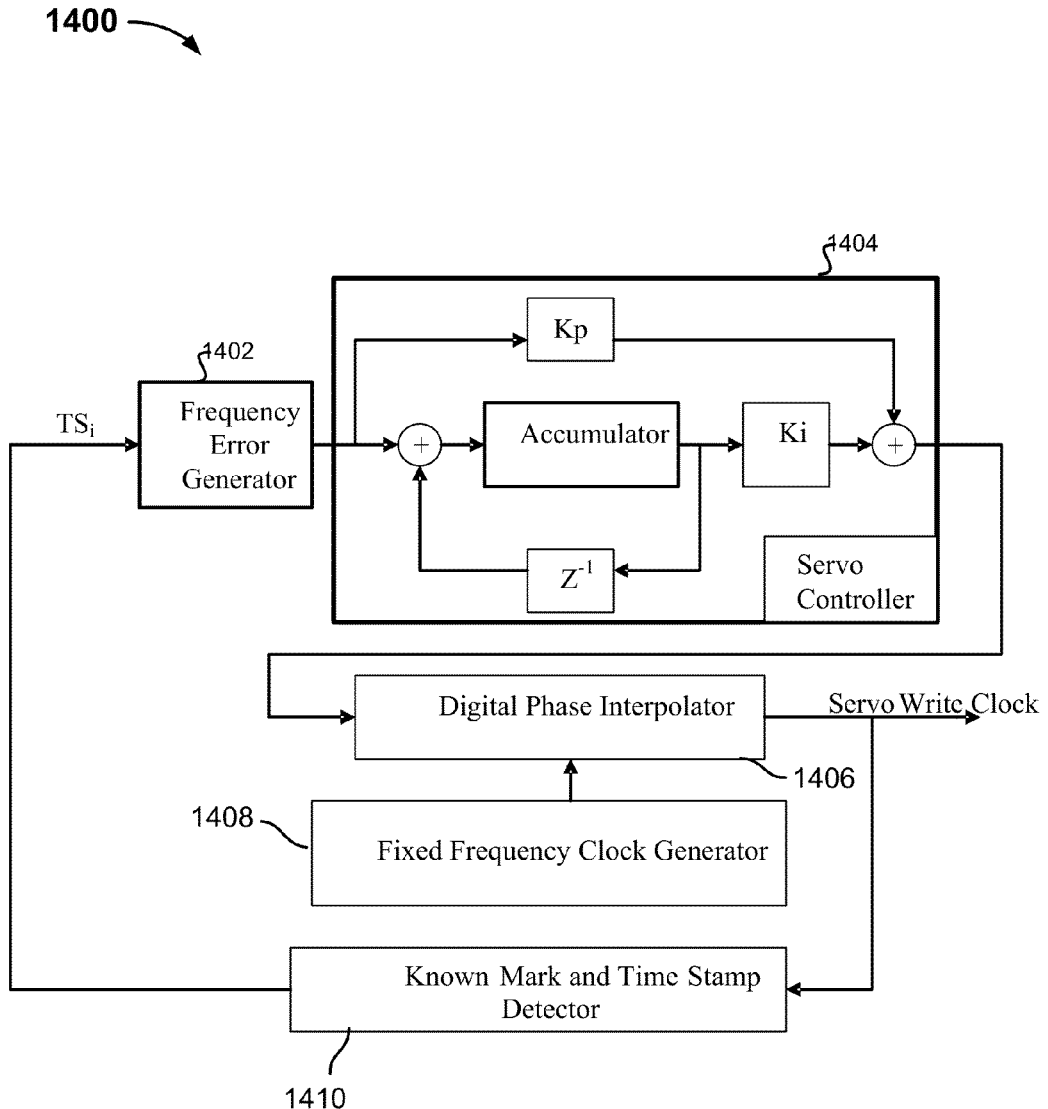
FIG. 14 is a block diagram illustrating an embodiment of a system for setting a servo write clock.

FIG. 14 is a block diagram illustrating an embodiment of a system for setting a servo write clock. In some embodiments, the servo write clock is used to write servo wedge code to the disk (e.g., when the clock resets or at some clock count x). System 1400 is shown to include: frequency error generator 1402, servo controller 1404, digital phase interpolator 1406, fixed frequency clock generator 1408, and spiral sync mark and time stamp detector 1410.

In some embodiments, frequency error generator takes time stamps $TS_i$ as input and computes $FERR_i$, which is input to servo controller 1404. In this example, servo controller 1404 is a second order loop filter and includes an integrator and accumulator. In various embodiments, servo controller 1404 may comprise other elements in place or in addition to a second order loop filter. For example, servo controller may be a pass through filter or a first order loop filter. In some embodiments, servo controller 1404 updates its output at the end of each wedge-to-wedge time interval i. In some embodiments, the accumulator in servo controller 1404 is configured to at least in part compute the target time indication $Tg_i$ when $Tg_i$ is defined as the average of time stamp $TS_i$ over a fixed number of consecutive disk revolutions.

Servo controller 1404 outputs an indication of an adjustment to be made to fixed frequency clock generator 1408. The output of servo controller 1404 and the fixed frequency clock (that is output by fixed frequency clock generator 1408) are input to digital phase interpolator 1406. Digital phase interpolator 1406 adjusts the fixed frequency clock based on the output of loop filter 1404 to generate the servo write clock (e.g., the modulo counter). The servo write clock is fed back through spiral sync mark and time stamp detector 1410, which detects the sync marks and outputs time stamps $TS_i$.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for writing servo wedge code to a disk, comprising:
   determining a wedge-to-wedge time interval;
   at least until it is determined that a lock criterion is met, using a processor to:
      for each wedge-to-wedge time interval, compute a wedge frequency error based on an adjustable clock to obtain a plurality of wedge frequency errors;
      adjust the clock based on one or more of the plurality of wedge frequency errors; and
      determine whether a lock criterion is met based on one or more of the plurality of wedge frequency errors;
   after the lock criterion is met, writing servo wedge code to the disk; and
   in the event one of the plurality of wedge frequency errors exceeds a maximum wedge frequency error, setting that wedge frequency error to 0.

2. A method as recited in claim 1, wherein for each wedge-to-wedge time interval, the clock is adjusted based at least in part on the wedge frequency error associated with that wedge-to-wedge time interval.

3. A method as recited in claim 1, wherein the wedge-to-wedge time interval is determined based at least in part on the total number of servo wedges to be written.

4. A method as recited in claim 1, wherein computing a wedge frequency error includes:
   detecting a known mark in a spiral segment in an intersection of a spiral waveform with a track on a disk;
   determining a current detection time indication associated with a time when the known mark was detected; and
   computing the wedge frequency error based at least in part on the current detection time indication and a previous detection time indication.

5. A method as recited in claim 4, wherein the previous detection time indication is associated with the time of detection of the same known mark in a previous revolution.

6. A method as recited in claim 4, wherein computing the wedge frequency error includes taking the difference between a current detection time indication and a previous detection time indication.

7. A method as recited in claim 4, further including determining whether the known mark needs to be changed due to a servo wedge being written over the known mark and in the event that the known mark needs to be changed, changing the known mark.

8. A method as recited in claim 4, wherein there are two intersections per wedge-to-wedge time interval.

9. A method as recited in claim 1, wherein the lock criterion is met when, for each wedge-to-wedge time interval, the absolute value of the corresponding wedge frequency error is within a wedge frequency error limit for a predefined number of consecutive disk revolutions.

10. A method as recited in claim 1, wherein after the lock criterion is met, computing a wedge frequency error is performed differently from before the lock criterion is met.

11. A method as recited in claim 1, wherein the lock criterion is met if each of the plurality of wedge frequency errors is less than a wedge frequency error limit for a certain number of disk revolutions.

12. A method as recited in claim 11, wherein after the lock criterion is met, the adjustable clock resets at the same circumferential location in each wedge-to-wedge time interval on every disk revolution, within a wedge frequency error limit.

13. A method as recited in claim 1, wherein the clock is adjusted based at least in part on an output of a loop filter that takes the wedge frequency error as input.

14. A method as recited in claim 13, wherein the loop filter includes an accumulator configured to sum two or more of the plurality of wedge frequency errors.

15. A method for writing servo wedge code to a disk, comprising:
   determining a wedge-to-wedge time interval;
   at least until it is determined that a lock criterion is met, using a processor to:
      for each wedge-to-wedge time interval, compute a wedge frequency error based on an adjustable clock to obtain a plurality of wedge frequency errors;
      adjust the clock based on one or more of the plurality of wedge frequency errors; and
      determine whether a lock criterion is met based on one or more of the plurality of wedge frequency errors; and
   after the lock criterion is met, writing servo wedge code to the disk, wherein after the lock criterion is met, the wedge frequency error is computed based at least in part on one or more of the following:
      a target detection time indication defined as the value of the time stamp when changing to the lock state; or
      a target detection time indication that stays the same during the lock state.

16. A method for writing servo wedge code to a disk, comprising:
   determining a wedge-to-wedge time interval;
   at least until it is determined that a lock criterion is met, using a processor to:

for each wedge-to-wedge time interval, compute a wedge frequency error based on an adjustable clock to obtain a plurality of wedge frequency errors;

adjust the clock based on one or more of the plurality of wedge frequency errors; and determine whether a lock criterion is met based on one or more of the plurality of wedge frequency errors; and after the lock criterion is met, writing servo wedge code to the disk, wherein:

the lock criterion is met if each of the plurality of wedge frequency errors is less than a wedge frequency error limit for a certain number of disk revolutions; and the adjustable clock resets $N_{wedge}$ times per disk revolution, where $N_{wedge}$ is the number of wedges on the disk.

17. A system for writing servo wedge code to a disk, comprising:

a processor configured to:

determine a wedge-to-wedge time interval;

at least until it is determined that a lock criterion is met:

for each wedge-to-wedge time interval, compute a wedge frequency error based on an adjustable clock to obtain a plurality of wedge frequency errors;

adjust the clock based on one or more of the plurality of wedge frequency errors; and determine whether a lock criterion is met based on one or more of the plurality of wedge frequency errors;

after the lock criterion is met, write servo wedge code to the disk; and in the event one of the plurality of wedge frequency errors exceeds a maximum wedge frequency error, setting that wedge frequency error to 0; and a communication interface coupled to the processor.

18. The system recited in claim 17, wherein the processor is configured to compute a wedge frequency error at least in part by:

detecting a known mark in a spiral segment in an intersection of a spiral waveform with a track on a disk;

determining a current detection time indication associated with a time when the known mark was detected; and computing the wedge frequency error based at least in part on the current detection time indication and a previous detection time indication.

19. A system as recited in claim 17, wherein the lock criterion is met when, for each wedge-to-wedge time interval, the magnitude of the corresponding wedge frequency error is within a wedge frequency error limit for a predefined number of consecutive disk revolutions.

20. A system as recited in claim 17, wherein after the lock criterion is met, computing a wedge frequency error is performed differently from before the lock criterion is met.

21. A system as recited in claim 17, wherein the system is in a search state before the lock criterion is met and the system is in a lock state after the lock criterion is met.

22. A system for writing servo wedge code to a disk, comprising:

a processor configured to:

determine a wedge-to-wedge time interval;

at least until it is determined that a lock criterion is met:

for each wedge-to-wedge time interval, compute a wedge frequency error based on an adjustable clock to obtain a plurality of wedge frequency errors;

adjust the clock based on one or more of the plurality of wedge frequency errors; and determine whether a lock criterion is met based on one or more of the plurality of wedge frequency errors; and after the lock criterion is met, write servo wedge code to the disk, wherein after the lock criterion is met, the wedge frequency error is computed based at least in part on one or more of the following:

a target detection time indication defined as the value of the time stamp when changing to the lock state; or a target detection time indication that stays the same during the lock state; and a communication interface coupled to the processor.

23. A system for writing servo wedge code to a disk, comprising:

a processor configured to:

determine a wedge-to-wedge time interval;

at least until it is determined that a lock criterion is met:

for each wedge-to-wedge time interval, compute a wedge frequency error based on an adjustable clock to obtain a plurality of wedge frequency errors;

adjust the clock based on one or more of the plurality of wedge frequency errors; and determine whether a lock criterion is met based on one or more of the plurality of wedge frequency errors; and after the lock criterion is met, write servo wedge code to the disk, wherein:

the lock criterion is met if each of the wedge frequency errors is less than a wedge frequency error limit for a certain number of disk revolutions; and the adjustable clock resets $N_{wedge}$ times per disk revolution, where $N_{wedge}$ is the number of wedges on the disk;

a communication interface coupled to the processor.

* * * * *